April 6, 1954 E. M. CREAMER, JR 2,674,651

ELECTRICAL SYSTEM

Filed June 26, 1951 2 Sheets-Sheet 1

INVENTOR.
EDGAR M. CREAMER JR.
BY Allen V. Hazeltine
ATTORNEY

April 6, 1954 E. M. CREAMER, JR 2,674,651

ELECTRICAL SYSTEM

Filed June 26, 1951 2 Sheets-Sheet 2

INVENTOR.
EDGAR M. CREAMER JR.
BY
Allen V. Hazeltine
ATTORNEY

Patented Apr. 6, 1954 2,674,651

UNITED STATES PATENT OFFICE 2,674,651

ELECTRICAL SYSTEM

Edgar M. Creamer, Jr., Philadelphia, Pa., assignor to Philco Corporation, Philadelphia, Pa., a corporation of Pennsylvania Application June 26, 1951, Serial No. 233,624

12 Claims. (Cl. 178—5.4)

The present invention relates to electrical systems and more particularly to cathode-ray tube systems comprising a beam intercepting member and an indexing member which is arranged in cooperative relationship with the beam intercepting member and is adapted to produce a signal whose time of occurrence is indicative of the position of the cathode-ray beam relative to the beam intercepting member.

The invention is particularly adapted for use and will be described in connection with a color television image presentation system utilizing a single cathode-ray tube having a beam-intercepting, image-forming screen member comprising vertical stripes of luminescent materials. These stripes are preferably arranged in laterally-displaced color triplets, each triplet comprising three vertical phosphor stripes which respond to electron impingement to produce light of the different primary colors. The order of arrangement of the stripes may be such that the normally horizontally-scanning cathode-ray beam produces red, green and blue light successively as it impinges successive stripes. From a color television receiver there may then be supplied three separate video signals, each indicative of a different primary color component of a televised scene, which signals are sampled sequentially and utilized to control the intensity of the cathode-ray beam. For proper color rendition, it is then required that, as the phosphor stripes producing each of the primary colors of light are impinged by the cathode-ray beam, the intensity of the beam be simultaneously controlled in response to the contemporaneous value of the video signal representing the corresponding color component of the televised image. However, since the rate at which the beam scans across the phosphor stripes of the screen may vary, due, for example, to non-linearity of the beam deflecting signal, or due to a non-uniform distribution of the color triplets on the screen surface, the times at which the samples of the several video color signals should be taken will generally not occur exactly periodically. To obtain proper timing of the sampling operations, it is therefore desirable to derive signals indicative of the instantaneous position of the cathode-ray beam upon the image-forming screen, and to utilize these indexing signals to control the times at which samplings of the several color signals are effected. The said indexing signals may be derived from a plurality of stripe members arranged on the beam intercepting screen structure each adjacent a triplet so that, when the beam scans the screen, the indexing stripes are excited in spaced time sequence relative to the scanning of the color triplets and a series of pulses is generated in a suitable output electrode system of the cathode-ray tube.

The indexing stripes may comprise a material having secondary-emissive properties which differ from the secondary-emissive properties of the remaining portions of the beam intercepting structure. For example, the indexing stripes may consist of a high atomic number material such as gold, platinum or tungsten or may consist of certain oxides such as magnesium oxide, and the remainder of the beam intercepting structure may be provided with a coating of a material having a detectably different secondary-emissive ratio, such as aluminum, which coating also serves as a light reflecting mirror for the phosphor stripes in accordance with well known practice. With such an arrangement the indexing signals may be derived from a collector electrode arranged in the vicinity of the screen structure. Alternatively, the indexing stripes may consist of a fluorescent material such as zinc oxide having a spectral output in the non-visible light region and the indexing signals may be derived from a suitable photo-electric cell arranged, for example, in a side wall portion of the cathode-ray tube out of the path of the cathode-ray beam and facing the beam intercepting surface of the screen structure.

In practice there exists the danger that the normally detectable voltage indicating the impingement of the beam on the indexing stripes may be masked or at least contaminated by spurious voltages. More particularly, it is found that, at the high accelerating voltages of the order of 10 to 20 kilovolts used in the cathode-ray tubes of the systems under consideration, only a relatively small difference in the secondary-emissive ratio of the materials of the indexing stripes and of the remainder of the screen structure can be realized and that, in the heretofore proposed systems, the presence of video signals and noise voltages in the collector electrode system may significantly diminish the effective value of the indexing signal. Similarly, in those instances in which the indexing signal is produced by means of a photo-electric detector and indexing stripes comprising a fluorescent material which produces light in the non-visible region of the spectrum, the detector also may be actuated by soft X-rays which are produced by the high voltage beam or by extraneous light from sources external to the cathode-ray tube or from the phosphor stripes of the color triplets, the latter light in some instances penetrating the aluminum mirror coating superimposed on the color stripes.

In the copending application of E. M. Creamer, Jr., et al., Serial No. 240,324 filed August 4, 1951, there have been described systems by means of which the desired indexing information may be obtained in a readily usable form with a minimum of components at the video signal frequencies appearing in the indexing signal circuits. More particularly, and in accordance with the principles set forth in said copending application, use is made of the finding that the scanning of the indexing stripes by the electron beam will produce, in the collector circuit of the cathode-ray tube, signal components which represent modulation products as determined by the intensity variations of the beam and the rate of scanning of the index stripes. Accordingly, by additionally varying the intensity of the beam at a pilot carrier frequency rate widely different from the rate at which the beam intensity is varied by the video signal, an output signal is produced in the collector electrode of the cathode-ray tube comprising, as one component, modulation products proportional to the pilot carrier frequency and the rate of scanning the index stripes. Because of their widely different frequency range, these modulation products may readily be separated from the generated modulation products which are proportional to the video signal frequencies and the rate of scanning of the index stripes. The pilot carrier modulation products consist essentially of a carrier wave at the pilot carrier frequency and sidebands representing the sum and difference of the pilot carrier frequency and the rate of scanning the index stripes. Any change in the rate of scanning of the index stripes will be indicated by a change in the frequencies of the sidebands, and accordingly the separated signal or one of its sidebands will serve as an indexing signal of high quality.

In some instances, secondary factors within the cathode-ray tube system above described may operate to contaminate the indexing signal so produced so that the signal is no longer precisely definitive of the absolute position of the cathode-ray beam. More particularly, it has been found that, due to manufacturing tolerances of the beam generating elements of the cathode-ray tube, the beam-current versus control-voltage characteristic of the cathode-ray tube may exhibit serious departures from linearity so that undesirable cross-modulation may take place between the video signal and the pilot carrier signal applied to the intensity control element thereof. The cross-modulation so produced introduces new components which similarly vary the intensity of the beam and appear as spurious signals in the output indexing circuit of the cathode-ray tube. Since the heterodyne products of the cross-modulation may have frequencies within the frequency band of the indexing signal, their presence may undesirably affect the system operation and bring about inaccurate or at least degraded reproduction of the colors of the image.

It is an object of the invention to provide an improved cathode-ray tube system of the type in which the position of the electron beam relative to a beam intercepting member is indicated by a signal produced by an indexing member arranged in cooperative relationship to the beam intercepting member.

Another object of the invention is to provide a cathode-ray tube system of the type in which the position of the electron beam is indicated by a signal produced by an associated indexing member and in which a clearly defined indexing signal is generated.

A specific object of the invention is to provide a cathode-ray tube system operating on principles above outlined and in which spurious signals, which are due to cross-modulation of video and pilot carrier signals applied to the beam intensity control electrode of a cathode-ray tube, are avoided.

These and further objects of the invention will appear as the specification progresses.

In accordance with the invention, the foregoing objects are achieved by employing a cathode-ray tube having disposed therein a beam intercepting structure comprising beam position indicating elements arranged in predetermined geometric relationship to other portions of the beam intercepting structure. These beam position indicating elements, as above pointed out, may be in the form of spaced stripes chraracterized by values of secondary-emissive ratio or by spectral emission characteristics which differ from those characterizing other regions of the beam intercepting structure when electrons of the cathode-ray beam impinge thereon. By applying to the beam intensity control system of the cathode-ray tube both a color video signal, having color information occurring at the repetition rate at which successive color triplets of the beam intercepting structure are scanned, and a pilot carrier wave, the cathode-ray beam is simultaneously varied in intensity by the two signals. As the beam scans the indexing stripes, it will in turn produce secondary electrons which generate, in the output circuit of the tube, two component signals, one of which is proportional to the product of the video signal intensity variations of the beam and the rate of scanning of the indexing stripes, and the other of which is proportional to the pilot carrier signal intensity variations of the beam and the rate of scanning of the indexing stripes. Since the latter component signal may be made to have a frequency spectrum widely separated from the frequency spectrum of the first component signal by an appropriate selection of the frequency of the pilot carrier signal, the two components may be readily separated in the output collector system of the cathode-ray tube. Furthermore, since the sidebands of the said latter component are determined by the algebraic sum of the pilot carrier frequency and the rate of scanning of the index stripes, it will be apparent that any departures of the scanning velocity of the beam or non-uniformities in the positioning and distribution of the index stripes will be reflected as a change in the frequency of the sidebands, and accordingly the latter component or a sideband thereof may be utilized as an indexing signal. As pointed out above, in some instances non-linearities of the beam-current versus control-voltage characteristic of the beam generating elements of the tube may cause an interaction or cross-modulation of the two signals applied to the beam control system of the cathode-ray tube and thereby produce undesired signals which additionally vary the intensity of the beam. These spurious variations of the intensity of the beam will produce spurious signals in the output indexing circuit of the tube, either directly because they represent sum and difference frequencies which are the same as the sum and difference frequencies produced by the heterodyne action of the pilot carrier and the index stripes, or indirectly because they represent harmonics of difference frequencies, etc., which produce a heterodyne action with the index stripes.

In accordance with the invention, a signal having a central frequency equal to the frequency of the pilot carrier and having sidebands similar to those produced by the cross-modulation action of the video and pilot carrier signals, is applied to the beam control system of the cathode-ray tube in such phase as to cancel the generated cross-modulation products. More particularly, and in accordance with one embodiment of the invention, there is provided an auxiliary premodulation system to which the video signal and pilot carrier are applied. The premodulation system is adjusted to exhibit a modulation characteristic similar to the non-linear characteristic of the cathode-ray tube so as to generate a modulation signal similar to the cross-modulation signal generated in the cathode-ray tube. The signal so generated is applied to the cathode-ray tube in such a sense as to produce the desired cancellation. In accordance with a further embodiment of the invention, there are provided means to derive the cross-modulation products from the cathode-ray tube and to reapply the same to the tube in a sense cancelling the initially generated cross-modulation products.

The invention will be described in greater detail with reference to the appended drawings forming part of the specification and in which.

Figure 1:
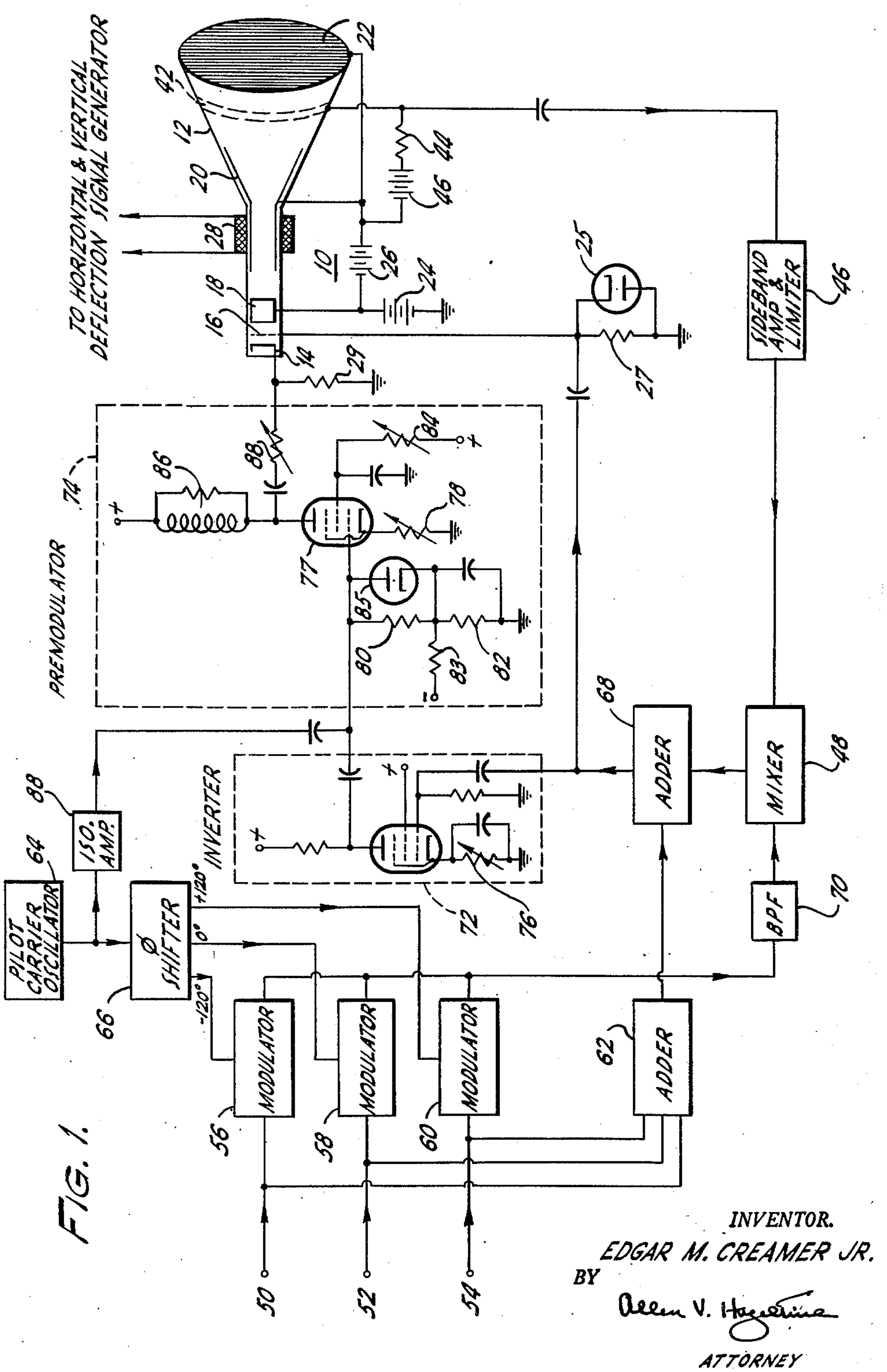
Figure 1 is a block diagram, partly schematic, illustrating one embodiment of the invention.

Referring to Figure 1, the cathode-ray tube system shown therein comprises a cathode-ray tube 10 containing, within an evacuated envelope 12, a conventionally constructed beam generating and accelerating electrode system comprising a cathode 14, a control electrode 16 for varying the intensity of the beam, a focusing electrode 18, and a beam accelerating electrode 20 which may consist of a conductive coating on the inner wall of the envelope and which terminates at a point spaced from the end face 22 of the tube in conformance with well-established practice. Suitable heating means (not shown) are provided for maintaining the cathode 14 at its operating temperature. The electrode system so defined is energized from a suitable source of potential shown as a battery 24 having its negative pole connected to ground and its positive pole connected to the electrode 18, and from a battery 26 having its negative pole connected to the positive pole of the battery 24 and its positive pole connected to the accelerating electrode 20. In practice the battery 24 has a potential of the order of 1 to 3 kilovolts whereas the battery 26 has a potential of the order of 10 to 20 kilovolts. The operating potential of the control electrode 16 may be established by a D.-C. restorer connected to the electrode 16 and consisting of a diode 25 appropriately poled and shunting a grid resistor 27. The cathode 14 is provided with a D.-C. return consisting of a resistor 29.

A deflection yoke 28 coupled to horizontal and vertical deflection circuits of conventional design (not shown) is provided for deflecting the generated electron beam across the face plate 22 of the cathode-ray tube to form a raster thereon.

Figures 2, 3:
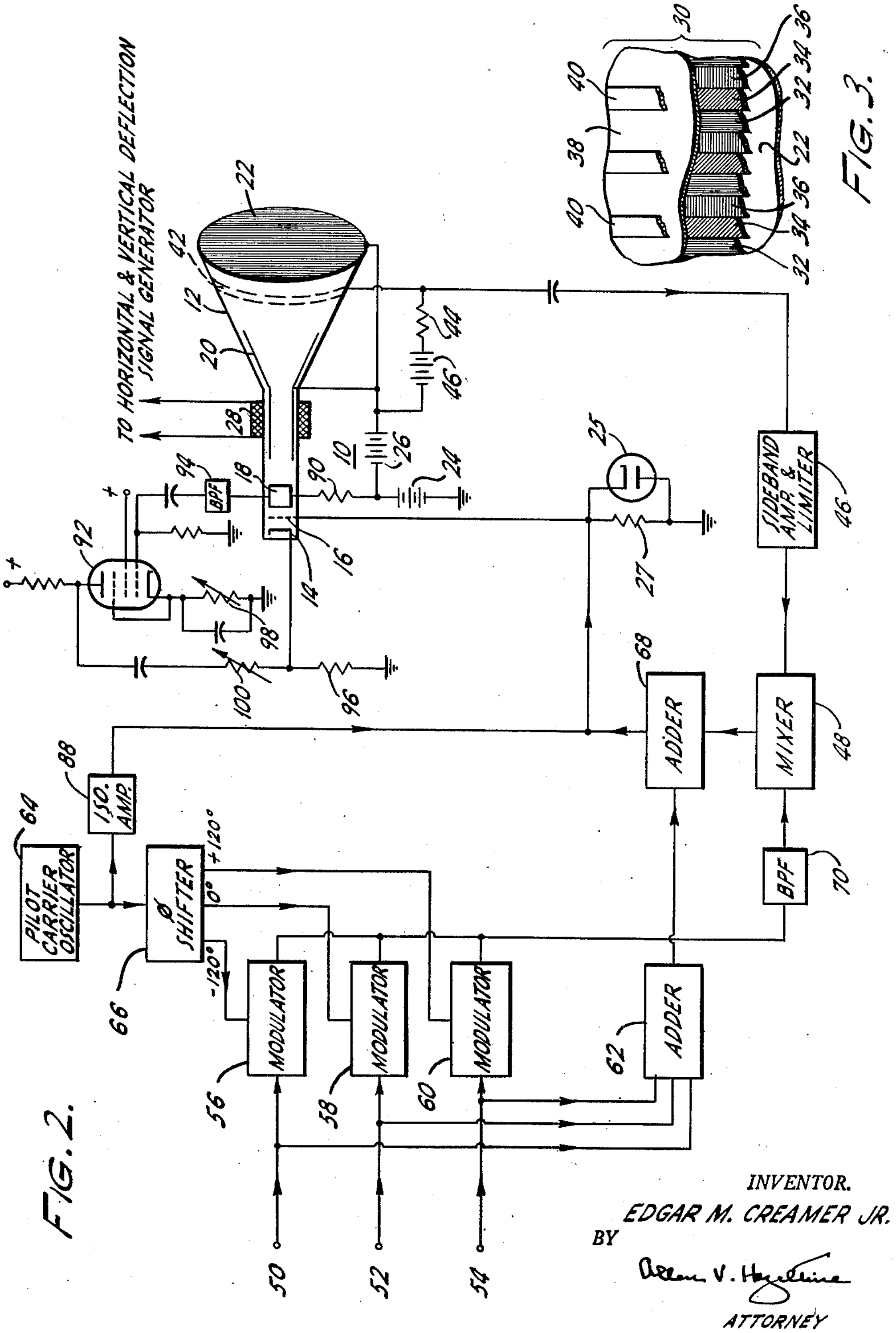
Figure 2 is a block diagram, partly schematic, illustrating another embodiment of the invention.
Figure 3 is a cross-sectional view, partly cut away, showing a portion of one form of beam intercepting structure for a cathode-ray tube which may be used in the system of the invention.

The end face plate 22 of the tube is provided with a beam intercepting structure 30, one suitable form of which is shown in detail in Figure 3. In the arrangement shown in Figure 3, the structure 30 is formed directly on the face plate 22. However, the structure 30 may alternatively be formed on a suitable light transparent base which is independent of the face plate 22 and may be spaced therefrom. In the arrangement shown, the end face 22, which in practice consists of glass having preferably substantially uniform transmission characteristics for the various colors in the visible spectrum, is provided with a plurality of groups of elongated parallelly arranged stripes 32, 34 and 36, of phosphor material which, upon impingement by the cathode-ray beam, fluoresce to produce light of three different primary colors. For example, the stripe 32 may consist of a phosphor which produces red light, the stripe 34 may consist of a phosphor which produces green light, and the stripe 36 may consist of a phosphor which produces blue light. Each of the groups of stripes may be termed a color triplet and, as will be noted, the sequence of the stripes is repeated in consecutive order over the area of the structure 30. Suitable materials constituting the phosphor stripes 32, 34 and 36 are well known to those skilled in the art as well as the method of applying the same to the face plate 22, and further details concerning the same are believed to be unnecessary.

In the arrangement specifically shown, the indexing signal is produced by utilizing indexing stripes of a given secondary-emissive ratio differing from the secondary-emissive ratio of the remainder of the beam intercepting structure, and for this purpose the structure 30 further comprises a thin, electron-permeable conducting layer 38 of low secondary-emissivity. The layer 38 is arranged on the phosphor stripes 32, 34 and 36 and preferably further constitutes a mirror for reflecting light generated at the phosphor stripes. In practice the layer 38 is a light reflecting aluminum coating which is formed in well known manner. Other metals capable of forming a coating in the manner similar to aluminum, and having a secondary-emissive ratio detectably different from that of the material of the indexing member, may also be used. Such other metals are, for example, magnesium or beryllium.

Arranged on the coating 38 over consecutive green stripes 34 are indexing stripes 40 consisting of a material having a secondary-emissive ratio detectably different from that of the material of coating 38. The stripes 40, usually of gold, may consist of other high atomic number metals such of platinum or tungsten or of an oxide such as magnesium oxide, as previously pointed out.

The beam intercepting structure so constituted is connected to the positive pole of the battery 26 by means of a suitable lead attached to the aluminum coating 38.

Interposed between the end of the accelerating anode 20 and the beam intercepting structure 22 is an output collector electrode 42 consisting of a ring shaped coating, for example of graphite or of silver, on the wall of the envelope. Electrode 42 is energized through a load resistor 44 from a suitable source 46, shown as a battery. The source 46 may have a potential of the order of 3 kilovolts.

The cathode-ray beam in its horizontal travel across the beam intercepting structure 30 impinges successively on the coating 38 and the indexing stripes 40. When the beam is varied in intensity by a pilot carrier signal applied to the intensity control system of the tube 10 in a manner later to be more fully pointed out, the scanning beam will generate across the load resistor 44 an indexing signal made up of a carrier component at the frequency of the pilot carrier signal and sideband components representing the sum and difference frequencies of the pilot carrier and the rate at which the index stripes are scanned by the cathode-ray beam.

In a typical case, the intensity of the beam may be varied at a pilot carrier frequency of 38.5 mc./sec. and scanning of the index stripes 40 may occur at the rate of approximately 7 million per second as determined by the horizontal scanning rate and the number of index stripes 40 impinged per scanning period. Then a modulated carrier signal at 38.5 mc./sec. and having sidebands at approximately 31.5 and 45.5 mc./sec. will be produced. Changes in the rate of scanning of the index stripes 40 due to non-linearities of the beam deflection and/or non-uniformities of the spacing of the index stripes will produce corresponding changes in the frequencies of the sidebands. Therefore, the signal produced by the pilot carrier, or a sideband of that signal, may be used as an indexing signal indicative of the position of the beam on the surface of the beam interceptive structure 30. In the arrangement specifically shown in Figure 1, the lower sideband, i. e., the sideband at approximately 31.5 mc./sec., is utilized as the indexing signal and to this end the signal generated across load resistor 44 is supplied through a sideband amplifier and amplitude limiter 46 to a utilization circuit therefor consisting of a mixer 48. Amplifier 46 is of conventional design and is characterized by a band-pass response which transmits and amplifies only signals having a frequency in the range of the above noted lower sideband. The amplifier may embody conventional amplitude limiting means by which any amplitude modulation appearing on the signal may be removed and may be adapted to provide the desired amplification without phase distortion of the signals.

For the reproduction of a color image on the face plate of the cathode-ray tube, there are provided color signal input terminals 50, 52 and 54 which are supplied from a television receiver with separate signals indicative of the red, green and blue components of the televised scene, respectively. The system then operates to effectively convert these three color signals into a wave having the color information arranged in time reference sequence so that the red information occurs when the cathode-ray beam impinges the red stripe 32 of the beam intercepting structure 30, the green information occurs upon impingement of the green stripe 34 and the blue information occurs when the blue stripe 36 is impinged.

The conversion of the color signals into a color wave with sequentially occurring color components may be effected by a sampling procedure which effectively connects each of the input terminals in sequence with a common output channel, or may be effected by means of a modulation system suitably energized by the respective color signals and by appropriately phase related modulation signals. In the arrangement specifically shown, the desired conversion is effected by means of sine wave modulators 56, 58 and 60 in conjunction with an adder 62. Modulators 56, 58 and 60 may be of conventional form and may each consist, for example, of a dual grid thermionic tube to one grid of which is applied the color signal from the respective terminals 50, 52 and 54, and to the other grid of which is applied a carrier signal. The carrier signal is derived from a pilot carrier oscillator 64 through a phase shifter 66, the latter being adapted to produce, by means of suitable phase shifting networks, three modulation voltages appropriately phase displaced. In the arrangement specifically described, wherein the phosphor stripes 32, 34 and 36 (see Figure 3) are uniformly distributed throughout the width of each color triplet, the modulation voltages from the phase shifter 66 bear a 120° phase relationship as shown.

The individual waves produced at the outputs of the modulators will be sine waves, each amplitude modulated by the color signal applied to the respective modulator and each having a phase relationship determined by the particular modulation signal applied. The three modulators are coupled with their outputs in common whereby the three waves are combined to produce a resultant wave having a frequency equal to that of the carrier signal supplied by oscillator 64 and having amplitude and phase variations proportional to the amplitudes of the color signals. A band-pass filter 70 having a central frequency as determined by the frequency of the modulating signals applied to the modulators may be arranged in their common output to suppress undesirable modulation components.

The pilot carrier oscillator 64 further serves to provide a carrier signal for varying the intensity of the cathode-ray beam in accordance with the principles set forth in the above referred to copending application of E. M. Creamer et al. Accordingly, the oscillator 64 operates at a frequency outside the frequency spectrum of the video color wave applied to the control electrode 16 of the cathode-ray tube, i. e., at a frequency of 38.5 mc./sec. as above specifically illustrated.

The resultant wave at the common output circuit of modulators 56, 58 and 60 is applied to the mixer 48, together with the indexing signal derived from the amplifier and limiter 46, to produce a heterodyne difference signal having amplitude and phase variations as determined by the amplitudes of the color signals at the terminals 50, 52 and 54 and having further phase (and/or frequency) variations as determined by the variations in the rate of scanning of the index stripes of the beam intercepting structure of the cathode-ray tube. It will be noted that since the pilot carrier intensity variation of the cathode-ray beam and the modulation of the color signals at terminals 50, 52 and 54 occur at the same frequency, the heterodyne difference signal produced by mixer 48 will have a central frequency equal to the average rate of scanning the index stripes, so that each successive color triplet of the structure 30 will be energized by successive cycles of the said difference signal.

Each of the color signals supplied to the input terminals of modulators 56, 58 and 60 will, in general, include a reference level component definitive of brightness. While each modulator may be constructed so as to transmit this reference level component to its output, in practice this is generally not done. Preferably, the three color signals are combined in proper proportions in an adder 62 to yield a signal representative of the over-all brightness of the scene to be reproduced and this signal is in turn supplied to an adder 68 where it is combined with the composite color signal produced in the output of mixer 48.

The signal at the output of the adder 68 thus comprises a reference level component establishing the brightness information of the image to be reproduced and a modulated component establishing the chromaticity of the image. This signal is applied to the control electrode 16 of the cathode-ray tube and, in the absence of secondary influences, consecutive portions thereof will occur in exact time sequence with the scanning of the electron beam over consecutive phosphor stripes of the beam intercepting structure.

However, as pointed out above, in some instances the beam generating and modulating system of the cathode-ray tube may so seriously depart from linearity in its beam-current versus control-voltage characteristic that cross-modulation may take place between the pilot carrier and the color video signals applied to the control elements of the tube. The spurious signals so produced may have frequencies within the passband of the sideband amplifier 46 and thus contaminate the indexing signal. More particularly, in a system utilizing a pilot carrier frequency of 38.5 mc./sec. and a video color wave at 7 mc./sec., non-linearities of the cathode-ray tube beam generating assembly may produce heterodyne signals, one of which, having a frequency of 31.5 mc./sec., may vary the intensity of the cathode-ray beam at the same frequency as that of the lower sideband which is used as an indexing signal and which is generated by the beating of the intensity modulated beam at 38.5 mc./sec. with the indexing stripes. The spurious intensity variation of the beam will manifest itself as a spurious signal in the indexing circuit and, since this spurious signal has the same frequency as the desired index signal, it will pass through the sideband amplifier and limiter 46 and the mixer 48, thereby causing undesirable phase modulation of the video signal at the output of mixer 48 and consequent degradation of the reproduced image.

In accordance with the embodiment of the invention shown in Figure 1, the generation of this spurious signal is obviated by applying, to the beam intensity control elements of the cathode-ray tube, a modulated pilot carrier wave having sidebands similar to and in phase opposition to those normally generated by the tube elements. For this purpose, the arrangement shown in Figure 1 comprises a video signal inverter 72 for supplying desired amounts of the video signal in proper phase, and a premodulator 74 for applying compensating modulated pilot carrier components, to the cathode-ray tube. The inverter 72 may comprise a pentode type thermionic tube, the control grid of which is coupled through an isolating capacitor to the output of adder 68. By means of a variable cathode resistor 76 the amplification of the inverter 72 may be adjustably controlled so that a video color signal of the desired amplitude may be derived from the anode circuit of the tube.

In one convenient form, the premodulator 74 may comprise an electron tube operating with a non-linear characteristic matching the non-linear characteristic of the beam intensity varying system of the cathode-ray tube. More particularly, and in the specific arrangement shown, the premodulator 74 may comprise a pentode type thermionic tube 77 having a cathode returned to ground potential through an adjustable resistor 78, a control grid having a D.-C. return constituted by series connected resistors 80 and 82, a screen grid connected to a suitable source of positive potential through a variable resistor 84, and an anode connected to the positive potential source through an inductance-resistance network 86, which, together with the distributed capacitance of the tube, forms a damped circuit resonant at the frequency of the pilot carrier and its sidebands.

The video signal from the inverter 72, and a pilot carrier signal derived from the oscillator 64 through an isolation amplifier 88, are simultaneously applied to the control grid of the tube 77, and the resultant modulated signal appearing at the anode of tube 77 is applied through an adjustable resistor 88 to the cathode 14 of the cathode-ray tube. Since the modulated pilot signal applied to the cathode 14 by the premodulator 74 varies the intensity of the beam in opposition to the spurious intensity variations produced by non-linearities of the cathode-ray tube characteristic, the spurious beam intensity variations are effectively cancelled and the beam impinging on the index stripes of the beam intercepting structure will be free of the spurious components produced by the non-linearity.

The characteristics of the premodulator 74 may be matched to those of the cathode-ray tube by appropriate adjustment of its operating parameters. More particularly, by means of the control 78, the non-linearity characteristic of the tube 77 may be adjusted to duplicate the non-linearity characteristic of the cathode-ray tube for given values of the applied pilot carrier. By means of the screen potential control 84 the anode-current cut-off value of the tube is adjusted for a given value of the static grid bias as established by the resistor 82, a bias supply resistor 83 in series with resistor 82 and a bias potential applied to the free end of resistor 83. The operating bias of the tube is further established by a diode 85 shunting the resistor 80. By means of the variable resistor 88 which forms an R.-C. network with the distributed capacitance of the cathode 14 of the cathode-ray tube, the modulation products at the output of tube, 77, may be brought into phase opposition coincidence with the cross-modulation products generated in tube 10. The absolute level of the modulation products generated by the tube 77 is controllable by varying the amplification of the inverter 72 by means of the variable cathode resistor 76.

From the foregoing, it will be seen that the intensity of the cathode-ray tube beam is varied simultaneously by the video color signal and by a pilot carrier in conformance with the principles set forth in the aforementioned copending application of E. M. Creamer, Jr., et al. In the specific arrangement shown, this simultaneous variation of the beam intensity is effected by the video color signal which is applied to the control electrode 16 and by the pilot carrier from the source 64 which is applied to the cathode 14 through the premodulator 74. Furthermore, in accordance with the present invention, the cross-modulation products generated in the tube 10, because of non-linear interaction of the two signals applied to the beam intensity controlling elements, is cancelled by the inverted modulation products generated by the premodulator 74 and applied to the cathode 14.

Figure 2 shows another embodiment of the invention in which modulation products are applied to the cathode-ray tube in opposition to those generated by the tube to thereby obviate the generation of spurious signals in the indexing control circuit. Certain components of the system shown in Figure 2 are similar to those found in the embodiment of the invention shown in Figure 1 and accordingly similar components have been indicated by the same reference numerals. The system shown in Figure 2 comprises a cathode-ray tube 10 having a cathode 14, a control electrode 16, a focusing anode 18, an accelerating electrode 20, a beam intercepting structure 22, and a secondary-emission collector electrode 42 arranged between the structure 22 and the electrode 20. Operating potentials for the tube are supplied by sources 24, 26 and 46, the source 24 being connected to the electrode 18 through a load resistor 90 for a purpose later to be more fully discussed.

The video signal is applied to the control electrode 16 in the same manner as described in connection with Figure 1. More particularly, there are provided three sine wave modulators 56, 58 and 60 having their inputs individually coupled to three color signal terminals 50, 52 and 54, each of the modulators being excited by individual modulating voltages appropriately phase displaced and derived from a pilot carrier oscillator 64 through a phase shifter 66.

The combined output signal from the modulators 56, 58 and 60, is applied through a band-pass filter 70 to a mixer 48, to which is also applied a lower sideband signal which serves as an index signal and is derived from the indexing stripes of the cathode-ray tube through the amplifier and limiter 46. Similarly, as in the case of the system of Figure 1, the brightness components of the video color signals are combined by an adder 62 and the resultant over-all brightness component is combined with the heterodyne output of the mixer 48 by means of an order 68.

The video color signal derived from the adder 68, and a pilot carrier signal derived from the oscillator 64 through an isolation amplifier 88, are applied together to the control electrode 16 of the cathode-ray tube 10. The two signals so applied to control electrode 16 simultaneously vary the intensity of the electron beam so that as the beam scans the beam intercepting structure 22, it will appropriately excite the phosphor stripes of the consecutive color triplets of the screen and will also excite the indexing stripes of the screen, producing, in the latter instance, a modulated wave having a central frequency at the frequency of the pilot carrier and sidebands at the sum and difference frequencies determined by the pilot carrier frequency and the rate of scanning of the index stripes. As above indicated, the difference frequency or lower sideband component is utilized as an indexing signal and this component of the modulation products produced by scanning the index stripes is separated out by the sideband amplifier and limiter 46.

In order to avoid spurious variations of the intensity of the beam and thus the creation of spurious signals in the output index circuit of the cathode-ray tube due to cross-modulation of the video signal and the pilot carrier signal applied to the control electrode 16, the arrangement shown in Figure 2 provides a feedback system which derives, from the electrode system of the cathode-ray tube, a signal containing the undesired cross-modulation products and applies the so derived signal to the tube elements in proper cancelling phase. More particularly, by means of the load impedance 90, the focusing electrode 18 is made to operate as an anode of a triode system further constituted by the control electrode 16 and the cathode 14. The portions of the electron beam, which normally impinge on the electrode 18, will develop, across load resistor 90, a complex voltage, one component of which is representative of the multiplication products due to the cross-modulation of the video and pilot carrier signals. These multiplication products are supplied to the grid of an amplifier tube 92 through a band-pass filter 94 and reapplied across a cathode resistor 96 to the cathode 14 in a sense cancelling the originally generated cross-modulation. The amount of the signal so fed-back to the cathode may be controlled by varying the amplification of the tube 92, for example by means of an adjustable resistor 98 provided in the cathode circuit of tube 92. The phase of the reapplied signal may be adjusted by means of a variable resistor 100 arranged between the anode of tube 92 and the cathode 14 and forming, with the distributed capacity of the cathode 14, an R.-C. phase shifting network.

While I have described my invention by means of specific examples and in specific embodiments, I do not wish to be limited thereto for obvious modifications will occur to those skilled in the art without departing from the spirit and scope of the invention.

What I claim is:

1. A cathode-ray tube system comprising, a cathode-ray tube having a source of an electron beam, control means to vary the intensity of the beam, a beam intercepting structure comprising first portions adapted to produce a first given response upon impingement by said beam, said structure having second portions thereof spaced apart and adapted to produce a second given response when said beam impinges thereon, and means to produce an output signal indicative of intensity variations of said beam and of said second given response, means to periodically deflect said beam across said beam intercepting structure to thereby scan said beam over said first and second portions, means to apply to said control means first and second signals simultaneously varying the intensity of said beam, said control means having a non-linear beam-current versus control-voltage characteristic normally producing non-linear interaction of the intensity variations of said beam produced by said first and second signals and thereby normally producing in said output signal means a wave having components representing cross-modulation products of said first and second signals, and means to obviate said cross-modulation products comprising means to apply to said control means modulation products of said first and second signals in phase opposition to the phase of the said cross-modulation products normally produced by the said non-linear characteristics of said control means.

2. A cathode-ray tube system as claimed in claim 1 wherein said first signal is a control quantity for producing variations of said first given response and has a frequency spectrum of a given maximum extent and said second signal is a control quantity for producing variations of said second given response and has a frequency remote from the frequency spectrum of said first signal.

3. A cathode-ray tube system as claimed in claim 1 wherein said first signal has a frequency value approximating the rate of impingement of said beam on said second portions and said second signal has a frequency remote from the frequency of said first signal.

4. A cathode-ray tube system as claimed in claim 1 wherein said means to obviate said cross-modulation products comprises a premodulator; means to apply said first and second signals to said premodulator, and means to apply modulation products of said signals from said premodulator to said control means in phase opposition to the phase of the cross-modulation products produced by the said non-linear characteristics of said control means.

5. A cathode-ray tube system as claimed in claim 1 wherein said means to obviate said cross-modulation products comprises means to derive from said beam a compensation signal proportional to said cross-modulation products and means to apply said compensation signal to said control means in phase opposition to the phase of the cross-modulation products produced by the said non-linear characteristic of said control means.

6. A cathode-ray tube system for producing a color television image, comprising a cathode-ray tube having a source of an electron beam, control means to vary the intensity of the beam, a beam intercepting structure comprising consecutively arranged portions, each comprising a plurality of stripes of fluorescent material, each of said stripes producing light of a different color upon impingement by said beam, said structure having second portions thereof spaced apart and comprising a material having a given response characteristic when said beam impinges thereon, means to produce an output signal indicative of intensity variations of said beam and of the said given response characteristic, means to periodically deflect said beam across said beam intercepting structure to thereby scan said beam over said first and second portions, means to apply to said control means first and second signals simultaneously varying the intensity of said beam, said first signal comprising a video color wave having a frequency spectrum of a given maximum extent and including a component having a frequency within said spectrum and approximating the rate of scanning said second portions and said second signal comprising a pilot carrier wave having a frequency remote from said frequency spectrum, said control means having a non-linear beam-current versus control-voltage characteristic normally producing non-linear interaction of the intensity variations of said beam produced by said first and second signals and thereby normally producing in said output signal means a wave having components representing cross-modulation products of said first and second signals, and means to obviate said cross-modulation products comprising means to apply to said control means modulation products of said first and second signals in a phase in opposition to the phase of the cross-modulation products normally produced by the said non-linear characteristic of said control means.

7. A cathode-ray tube system for producing a color television image as claimed in claim 6 wherein said means to obviate said cross-modulation products comprises a premodulator, means to apply said component and said pilot carrier signal to said premodulator and means to apply modulation products of said component and said pilot carrier signal from said premodulator to said control means in phase opposition to the phase of the cross-modulation products produced by the said non-linear characteristic of said control means.

8. A cathode-ray tube system for producing a color television image as claimed in claim 7 wherein said premodulator has a non-linear input-output characteristic matching the non-linear characteristic of said control means.

9. A cathode-ray tube system for producing a color television image as claimed in claim 6 wherein said means to obviate said cross-modulation products comprises means to derive from said beam a compensation signal proportional to said cross-modulation products and means to apply said compensation signal to said control means in phase opposition to the phase of the cross-modulation products produced by the said non-linear characteristic of said control means.

10. A cathode-ray tube system for producing a color television image, comprising a cathode-ray tube having a source of an electron beam, control means to vary the intensity of the beam, a beam intercepting structure comprising consecutively arranged portions each comprising a plurality of stripes of fluorescent material each producing light of a different primary color upon impingement by said beam, said structure having second portions thereof spaced apart and comprising a material having a given response characteristic when said beam impinges thereon and means to produce an output signal indicative of intensity variations of said beam and of the said given response characteristic, means to periodically deflect said beam across said beam intercepting structure to thereby successively scan said beam over the said first and second portions, said control means having a non-linear beam-current versus control-voltage characteristic normally producing non-linear interaction of the intensity variations of said beam when a plurality of signals are applied to said control means and thereby normally producing in said output signal means a wave having components representing cross-modulation products of the said signals applied to said control means, means to generate a pilot carrier wave of a given first frequency, means to produce a first color video wave having a component at the frequency of said pilot carrier wave, means to combine said first color video wave and said output signal to produce a second color video wave having a component at a frequency approximating the rate of scanning said second portions, means to invert the phase of said second color video wave, a premodulation system having a non-linear characteristic matching the non-linear characteristic of said control means, means to apply said inverted color video wave and said pilot carrier to said premodulation system to thereby produce modulation products of said inverted wave and said pilot carrier wave, and means to couple said premodulation system to said control means to thereby apply said modulation products to said control means in a phase in opposition to the phase of the cross-modulation products normally produced by the said non-linear characteristic of said control means.

11. A cathode-ray tube system for producing a color television image, comprising a cathode-ray tube having electron beam generating means including an anode, control means to vary the intensity of the beam, a beam intercepting structure comprising consecutively arranged portions each comprising a plurality of stripes of fluorescent material each producing light of a different primary color upon impingement by said beam, said structure having second portions thereof spaced apart and comprising a material having a given response characteristic when said beam impinges thereon and means to produce an output signal indicative of intensity variations of said beam and of the said given response characteristic, means to periodically deflect said beam across said intercepting structure to thereby successively scan said beam over the said first and second portions, said control means having a non-linear beam-current versus control-voltage characteristic normally producing non-linear interaction of the intensity variations of said beam when a plurality of signals are applied to said control means and thereby normally producing in said output signal means a wave having components representing cross-modulation products of said signals applied to said control means, means to generate a pilot carrier wave of given first frequency, means to produce a first color video wave having a component at the frequency of said pilot carrier wave, means to combine said first color video wave and said output signal to produce a second color video wave having a component at a frequency approximating the rate of scanning said second portions, means to apply said second color video wave and said pilot carrier wave to said control means, means to derive from said anode a compensating signal proportional to cross-modulation products of said second color video wave and said pilot carrier wave, and means to apply said compensating signal to said control means in phase opposition to the phase of the cross-modulation products produced by the said non-linear characteristic of said control means.

12. A cathode-ray tube system comprising, a cathode ray tube having a source of an electron beam, control means to vary the intensity of the beam, a beam intercepting structure comprising first portions adapted to produce a first given response upon impingement by said beam, said structure having second portions thereof spaced apart and adapted to produce a second given response when said beam impinges thereon, and means to produce an output signal indicative of intensity variations of said beam and of said second given response, means to periodically deflect said beam across said beam intercepting structure to thereby scan said beam over said first and second portions, means to apply to said control means first and second signals simultaneously varying the intensity of said beam, said control means having a non-linear beam-current versus control-voltage characteristic normally producing non-linear interaction of the intensity variations of said beam produced by said first and second signals and thereby normally producing in said output signal means a wave having components representing cross-modulation products of said first and second signals, and means to obviate said cross-modulation products comprising means to produce modulation products of said first and second signals, and means to combine in phase opposition the said generated modulation products and the said cross-modulation products normally produced by the said non-linear characteristic of said control means.

References Cited in the file of this patent

UNITED STATES PATENTS

| Number | Name | Date |
|---|---|---|
| 2,543,772 | Goldmark | Mar. 6, 1951 |
| 2,558,489 | Kalfaiain | June 26, 1951 |
| 2,587,074 | Sziklai | Feb. 26, 1952 |